(12) United States Patent
St-Laurent et al.

(10) Patent No.: US 10,979,332 B2
(45) Date of Patent: Apr. 13, 2021

(54) SYSTEM AND METHOD TO MEASURE AVAILABLE BANDWIDTH IN ETHERNET TRANSMISSION SYSTEM USING TRAIN OF ETHERNET FRAMES

(71) Applicant: Accedian Networks Inc., St-Laurent (CA)

(72) Inventors: Stephane St-Laurent, Roxboro (CA); Claude Robitaille, St-Placide (CA)

(73) Assignee: Accedian Networks Inc., St-Laurent (CA)

( * ) Notice: Subject to any disclaimer, the term of this patent is extended or adjusted under 35 U.S.C. 154(b) by 69 days.

(21) Appl. No.: 14/530,702

(22) Filed: Nov. 1, 2014

(65) Prior Publication Data

US 2016/0094428 A1    Mar. 31, 2016

Related U.S. Application Data

(63) Continuation-in-part of application No. 14/496,189, filed on Sep. 25, 2014, now abandoned.

(51) Int. Cl.
*H04L 12/26* (2006.01)

(52) U.S. Cl.
CPC ........ *H04L 43/0894* (2013.01); *H04L 43/106* (2013.01)

(58) Field of Classification Search
CPC ..... H04L 43/0893; H04L 12/26; H04W 24/06
See application file for complete search history.

(56) References Cited

U.S. PATENT DOCUMENTS

| | | |
|---|---|---|
| 6,535,983 B1 | 3/2003 | McCormack et al. |
| 6,545,979 B1 | 4/2003 | Poulin |
| 6,604,136 B1 | 8/2003 | Chang et al. |
| 6,715,087 B1 | 3/2004 | Vergnaud et al. |
| 6,868,094 B1 | 3/2005 | Bordonaro et al. |
| 7,113,485 B2 | 9/2006 | Bruckman |
| 7,114,091 B2 | 9/2006 | Vrancic |
| 7,242,693 B1 | 7/2007 | Acharya et al. |
| 7,257,123 B2 | 8/2007 | Choi et al. |

(Continued)

FOREIGN PATENT DOCUMENTS

| | | |
|---|---|---|
| EP | 1215559 | 6/2002 |
| JP | S6113414 | 1/1986 |

(Continued)

OTHER PUBLICATIONS

Estimating Available Bandwidth Using Packet Pair Probing. Ningning Hu, Peter Steenkiste Sep. 9, 2002. CMU-CS-02-166.*

(Continued)

*Primary Examiner* — Jeffrey M Rutkowski
*Assistant Examiner* — Basil Ma
(74) *Attorney, Agent, or Firm* — Stratford Managers Corporation (57) ABSTRACT

A method of measuring available bandwidth of a radio frequency (RF) transmission link, said method comprising transmitting a train comprising a plurality of frames of the transmission link, receiving the train, measuring the time taken to receive the train, and estimating the available bandwidth by dividing the number of bits transmitted by the difference between the receiving time of the leading frame in the train and the receiving time of the last frame in the train.

16 Claims, 4 Drawing Sheets

(56) References Cited

U.S. PATENT DOCUMENTS

| | | |
|---|---|---|
| 7,281,141 B2 | 10/2007 | Elkayam et al. |
| 7,283,568 B2 | 10/2007 | Robie, Jr. et al. |
| 7,286,482 B2 | 10/2007 | Charcranoon |
| 7,310,664 B1 | 12/2007 | Merchant et al. |
| 7,463,731 B2 | 12/2008 | Beyda et al. |
| 7,478,251 B1 | 1/2009 | Diab et al. |
| 7,519,006 B1 | 4/2009 | Wing |
| 7,710,905 B2 | 5/2010 | Dyck et al. |
| 7,787,483 B2 | 8/2010 | Vanderhaegen et al. |
| 7,878,057 B2 | 1/2011 | Robitaille et al. |
| 7,936,700 B2 | 5/2011 | Yamazaki et al. |
| 8,121,111 B2 | 2/2012 | Freiberger |
| 8,218,576 B2 | 7/2012 | Hansson et al. |
| 8,705,341 B2 | 4/2014 | Robitaille et al. |
| 8,908,540 B2* | 12/2014 | Oba .................... H04L 12/2697 370/252 |
| 2001/0000071 A1 | 3/2001 | Nichols |
| 2003/0048754 A1 | 3/2003 | Bruckman |
| 2003/0048811 A1 | 3/2003 | Robie et al. |
| 2003/0091209 A1 | 5/2003 | Jo et al. |
| 2003/0093513 A1 | 5/2003 | Hicks et al. |
| 2003/0115321 A1 | 6/2003 | Edmison et al. |
| 2003/0115368 A1 | 6/2003 | Wu |
| 2003/0219025 A1 | 11/2003 | Choi et al. |
| 2004/0078483 A1 | 4/2004 | Simila et al. |
| 2004/0105391 A1 | 6/2004 | Charcranoon |
| 2004/0136713 A1 | 7/2004 | Lim et al. |
| 2004/0164619 A1 | 8/2004 | Parker et al. |
| 2004/0165595 A1 | 8/2004 | Holmgren et al. |
| 2005/0078700 A1 | 4/2005 | Thompson et al. |
| 2005/0099949 A1 | 5/2005 | Mohan et al. |
| 2005/0099951 A1 | 5/2005 | Mohan et al. |
| 2005/0099952 A1 | 5/2005 | Mohan et al. |
| 2005/0144328 A1 | 6/2005 | McBeath |
| 2005/0148314 A1 | 7/2005 | Taglienti et al. |
| 2006/0051088 A1 | 3/2006 | Lee et al. |
| 2007/0217448 A1* | 9/2007 | Luo ........................ H04L 47/10 370/468 |
| 2007/0268850 A1 | 11/2007 | Hansson et al. |
| 2007/0274227 A1 | 11/2007 | Rauscher et al. |
| 2008/0005354 A1 | 1/2008 | Kryskow, Jr. et al. |
| 2008/0253301 A1* | 10/2008 | Keromytis ......... H04L 41/0896 370/252 |
| 2009/0161569 A1 | 6/2009 | Corlett |
| 2009/0190482 A1 | 7/2009 | Blair |
| 2010/0195517 A1 | 8/2010 | Kihara |
| 2010/0208613 A1* | 8/2010 | Oba .................... H04L 43/0882 370/253 |
| 2010/0283682 A1 | 11/2010 | Heidari-Bateni et al. |
| 2010/0322224 A1* | 12/2010 | Bae ................... H04W 72/1231 370/342 |
| 2011/0019557 A1* | 1/2011 | Hassan ............ H04W 28/0215 370/252 |
| 2012/0134668 A1 | 5/2012 | Freiberger |
| 2012/0218879 A1 | 8/2012 | Robitaille et al. |
| 2012/0257641 A1 | 10/2012 | Hansson et al. |
| 2013/0010600 A1 | 1/2013 | Jocha et al. |
| 2013/0170388 A1 | 7/2013 | Ito et al. |
| 2013/0322255 A1 | 12/2013 | Dillon |
| 2014/0043992 A1 | 2/2014 | Le Pallec et al. |
| 2015/0180757 A1* | 6/2015 | Oshiba .................. H04L 47/365 370/252 |
| 2015/0195205 A1* | 7/2015 | Flinta ..................... H04L 47/22 370/230.1 |

FOREIGN PATENT DOCUMENTS

| | | |
|---|---|---|
| JP | S62104339 | 5/1987 |
| JP | 2002-026947 | 1/2002 |
| JP | 2003-348119 | 12/2003 |
| JP | 2004-200933 | 7/2004 |
| WO | WO 2004/1040805 | 12/2004 |
| WO | WO 2005/025013 | 3/2005 |
| WO | WO 2006/033611 | 3/2006 |
| WO | WO 2006/114687 | 11/2006 |
| WO | WO 2014/006484 | 1/2014 |

OTHER PUBLICATIONS

ITU-T G.8013/Y.1731 OAM functions and mechanisms for Ethernet based networks.*
IETF RFC 2544—Benchmarking Methodology for Network Interconnect Devices Mar. 1999.*
IETF RFC 6985—IMIX Genome: Specification of Variable Packet Sizes for Additional Testing.*
Dovrolis et al. "Packet-Dispersion Techniques and a Capacity-Estimation Methodology" IEEE/ACM Transactions on Networking Dec. 2004 (Year: 2004).*
Atushi Otha, Introduction of detail mechanism of Ether OAM, The Institution of Electronics, Information and Communication Engineers Technical Report, CS2004-79-87 [Communication System], The Institution of Electronics, Information and Communication Engineers, Oct. 21, 2004, vol. 104, No. 380, pp. 35-40.
De Vito, L. et al. "One-Way Delay Measurement: State of the Art." IEEE Transactions on Instrumentation and Meas0urement. vol. 57, No. 12, Dec. 2008, pp. 2742-2750 (9 pages).
Extended European Search Report dated Sep. 27, 2013, which issued in European Patent Application No. 05779215.2 (6 pages).
Extended European Search Report dated Jul. 17, 2014, which issued in European Patent Application No. EP 06744558.5 (15 pages).
Fasbender, A. et al. "On Assessing Unidirectional Latencies in Packet-Switched Networks." IEEE International Conference on Communications, vol. 1, Jun. 8, 1997, pp. 490-494 (5 pages).
Hiroshi Ohta, Standardization Status on OAM and QoS Issues for Carrier-Class Ethernet, The Institution of Electronics, Information and Communication Engineers Technical Report, CS2004-79-87 [Communication System], The Institution of Electronics, Information and Communication Engineers, Oct. 21, 2004, vol. 104, No. 380, pp. 29-34.
International Search Report, PCT/IB2006/001000, dated Nov. 14, 2006, 4 pages.
International Search Report and Written Opinion dated Dec. 6, 2005, which issued in International Patent Application No. PCT/SE2005/001307 (9 pages).
International Search Report and Written Opinion dated Nov. 25, 2013, which issued in corresponding International Patent Application No. PCT/IB2013/001432 (10 pages).
International Written Opinion, PCT/IB2006/001000, dated Nov. 14, 2006, 6 pages.
International Telecommunication Union, ITU-T, G.8013/Y.1731, Series G: Transmission Systems and Media, Digital Systems and Networks, Jul. 2011 (92 pages).
International Telecommunication Union, ITU-T, Y.1564, Series Y: Global Information Infrastructure, Internet Protocol Aspects and Next-Generation Networks, Mar. 2011 (38 pages).
Mills, D. et al. "Network Time Protocol Version 4: Protocol and Algorithms Specification." Internet Engineering Task Force. Jun. 2010 (220 pages).
Pezaros, D. et al. "Low-Overhead End-to-End Performance Measurement for Next Generation Networks." IEEE Transactions on Network and Service Management. vol. 8, No. 1, Mar. 2011, pp. 1-14 (14 pages).
Sivrikaya, et al., "Time Synchronization in Sensor Networks: A Survey," Jul.-Aug. 2004, (10 pages).

* cited by examiner

SYSTEM AND METHOD TO MEASURE AVAILABLE BANDWIDTH IN ETHERNET TRANSMISSION SYSTEM USING TRAIN OF ETHERNET FRAMES

CROSS REFERENCE TO RELATED APPLICATIONS

This application is a continuation-in-part and claims priority to U.S. patent application Ser. No. 14/496,189, dated Sep. 25, 2014, which is incorporated herein by reference in its entirety.

FIELD OF THE INVENTION

The present disclosure relates to Ethernet transmission systems.

BRIEF SUMMARY

A method of measuring available bandwidth of a radio frequency (RF) transmission link, said method comprising: transmitting a train comprising a plurality of frames over said link; receiving said train; measuring time taken to receive said train; and estimating the available bandwidth, said estimating comprising dividing the number of bits transmitted by the difference between the receiving time of the leading frame in the train and the receiving time of the final frame of the train.

A system for measurement of available bandwidth of a radio frequency (RF) transmission link, said system comprising: transmitting test equipment for transmitting a train comprising a plurality of frames over said link; receiving test equipment for receiving said train; measurement of time taken to receive said train; and estimation of the available bandwidth, said estimation comprising dividing the number of bits transmitted by the difference between the receiving time of the first frame in the train and the receiving time of the last frame of the train.

A method of measuring available bandwidth of a radio frequency (RF) transmission link, said method comprising: transmitting a train comprising a plurality of frames over said link, wherein said frames are either the same length or have different length to one another; receiving said train; measuring time taken to receive each frame within said train; and estimating the available bandwidth, said estimating comprising dividing the number of bits transmitted by the difference between the receiving time of a first frame in the train and the receiving time of a second frame in the train.

A method of measuring available bandwidth of a radio frequency (RF) transmission link, said method comprising: transmitting a plurality of trains comprising a first and a second train, each train comprising a plurality of frames, herein the lengths of the frames corresponding to the first train is different to the lengths of the frames corresponding to the second train, said transmitting performed over said link, wherein for said first and second trains, said method further comprising receiving said train; measuring time taken to receive each frame within said train; estimating the available bandwidth, said estimating comprising dividing the number of bits transmitted by the difference between the receiving time of a leading frame in the train and the receiving time of a final frame in the train; and measuring said throughput as a function of frame length based on said estimating of the available bandwidth for the first and second trains.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

In a radio frequency (RF) transmission link, the available bandwidth of the link is different to that typically seen in wireline systems. The RF transmission link uses modulation schema that affect the overall bandwidth available for the transmission. RF equipment may have a 1 Gbps Ethernet interface and provide a much lower bandwidth to support an RF transmission link. The RF transmission bandwidth can also change over time due to environmental conditions when adaptive modulation techniques are used. It is extremely difficult to measure the available bandwidth in real-time since it could change rapidly over time, and prior art techniques cannot guarantee that the bandwidth available represents the maximum available bandwidth of the link. Furthermore, prior art techniques cannot be used to measure the link bandwidth as a function of the length of the packets or frames used within the link.

In the description to follow, the terms RF transmission link, RF link, radio link and wireless link may be used interchangeably.

A system and method to measure the available bandwidth of the RF transmission link is described below. In one embodiment, a train of Ethernet frames is sent over the RF transmission link in burst mode. The time taken to receive the train of Ethernet frames is then used to calculate the available bandwidth in bits per second.

Figure 1:
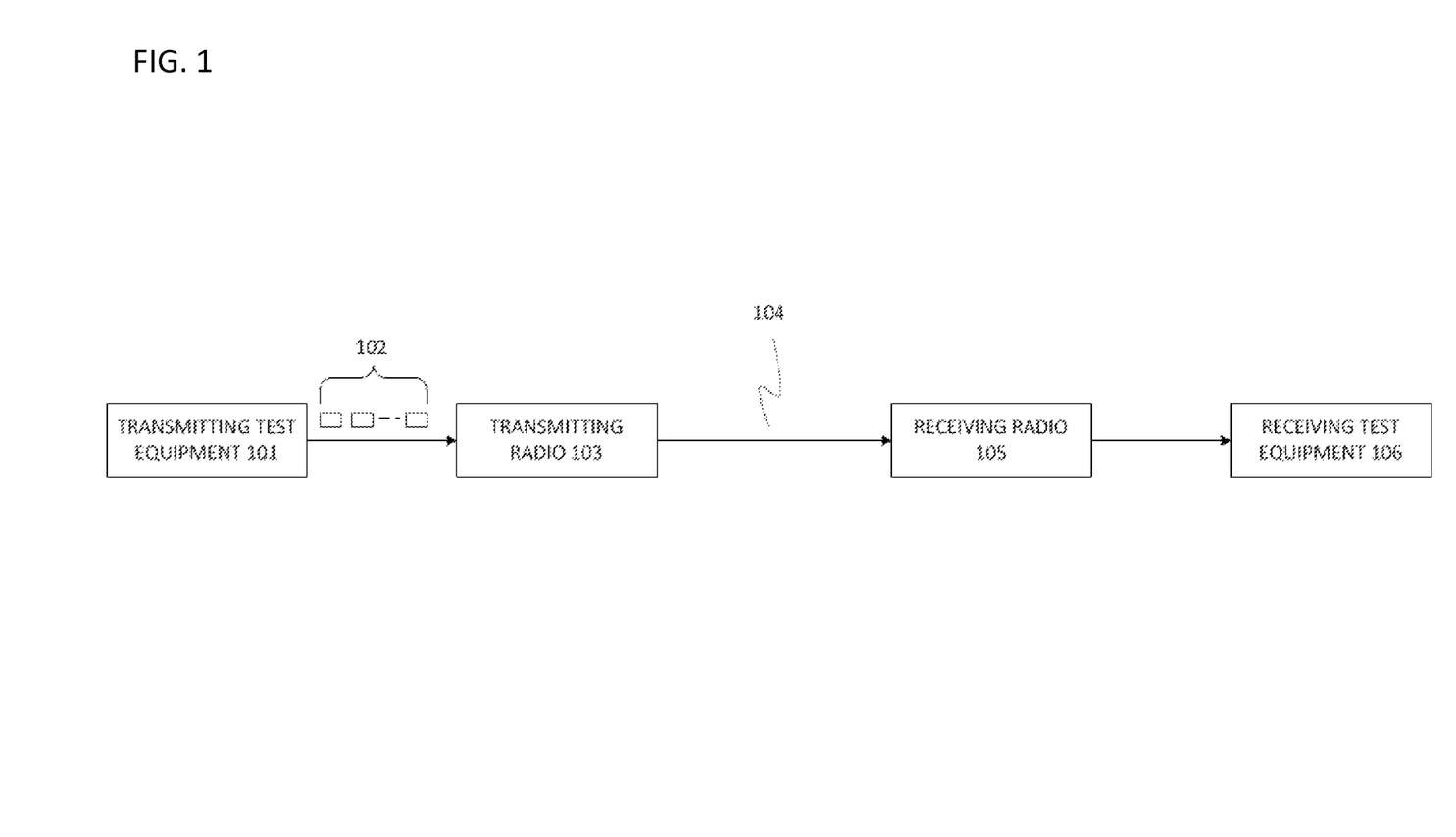
FIG. 1 shows an example embodiment of a system to measure the available bandwidth.

FIG. 1 shows an example embodiment of a system to measure the available bandwidth. In FIG. 1 transmitting test equipment 101 sends train of frames 102 to a transmitting radio 103. While the embodiments below are described with respect to Ethernet frames, one of skill in the art would know that the techniques described below can be applied to types of packets other than Ethernet frames. Transmitting radio 103 then sends train 102 over RF transmission link 104, where it is received by receiving radio 105. In one embodiment, receiving test equipment 106 measures the time taken to receive the train 102, and divides the total number of bits received by the time taken to obtain the available bandwidth.

Figure 2:
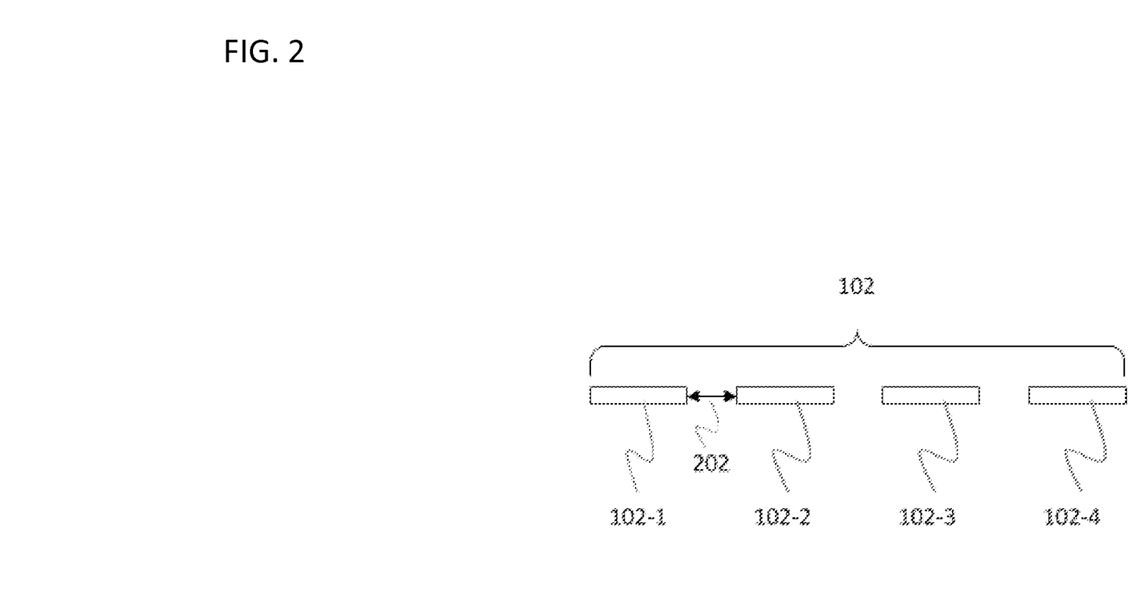
FIG. 2 illustrates the structure of a train comprising four frames.

FIG. 2 illustrates the structure of a train comprising four frames. Transmitting test equipment 101 creates a train 102 comprising frames 102-1, 102-2, 102-3 and 102-4. In one embodiment, each frame is structured according to the Delay Measurement Message (DMM) format defined in ITU-T Rec. G.8013/Y.1731 (July 2011) "OAM functions and mechanisms for Ethernet-based networks", herein incorporated by reference as if disclosed in its entirety. In another embodiment, each frame is structured in a proprietary format. In one embodiment, each of these frames are spaced from one another using a pre-determined minimum gap, such as gap 202, between frames 102-1 and 102-2. In one embodiment, this is the minimum Ethernet inter-frame gap. Since the frames are spaced from one another using a predetermined minimum gap, there are no other frames transmitted between these frames. In a further embodiment, each frame is stamped with an identifier associated with the train and the sequence number of the frame within the train. In yet another embodiment, each frame is timestamped with the frame transmission time by transmitting test equipment 101. In one embodiment, each frame has the same length. In another embodiment, each frame has a different length. In a further embodiment, if there are n frames in the train, the first n-1 frames are of equal length, and the last frame is smaller than the first n-1 frames. In one embodiment, the last frame is the minimum Ethernet frame size. In one embodiment, each frame has a preamble.

Figure 3:
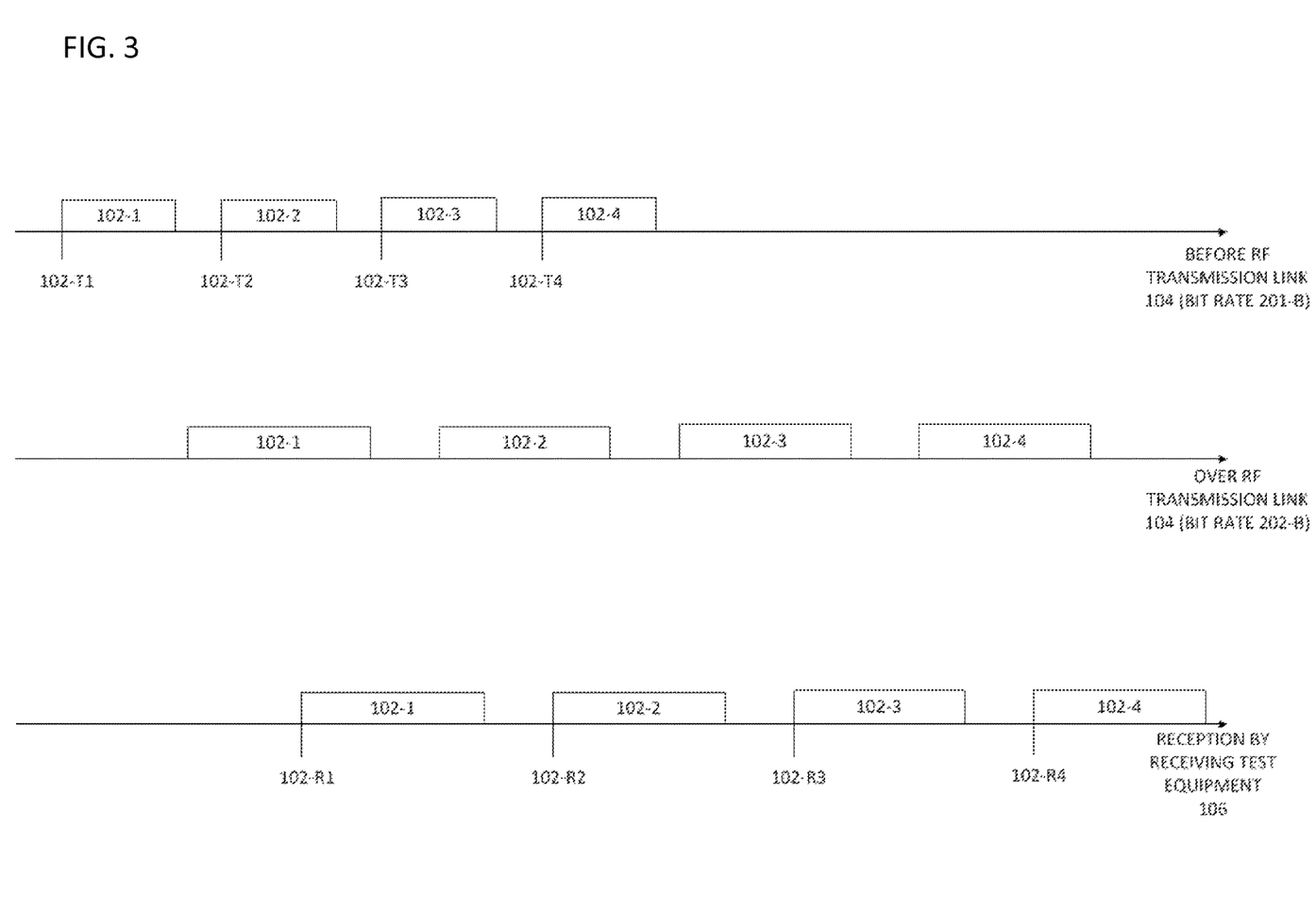
FIG. 3 is a diagrammatic illustration of a bandwidth calculation.
Figure 4:
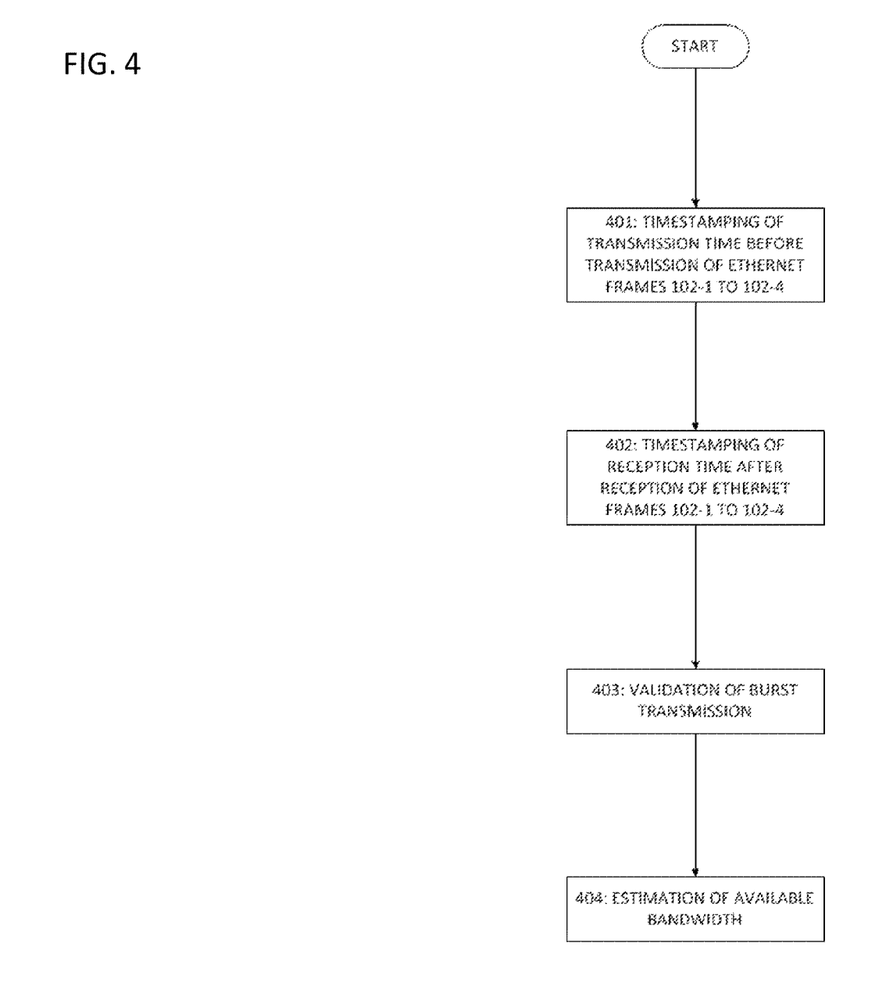
FIG. 4 is a flow chart of a bandwidth calculation.

FIGS. 3 and 4 show how the bandwidth calculation is performed. In step 401, Ethernet frames 102-1 to 102-4 are transmitted by transmitting test equipment 101 at bit rate 201-B before RF transmission link 104. The duration of a frame before RF transmission link 104 is given by the length of the frame in bits divided by 201-B. Each frame is stamped with a transmission time, for example, 102-T1 corresponding to 102-1, 102-T2 corresponding to 102-2, 102-T3 corresponding to 102-3 and 102-T4 corresponding to 102-4.

Upon reaching transmitting radio 103, since RF transmission link 104 operates at 202-B which is slower than 201-B, frame duration during transmission over RF transmission link 104 increases compared to the duration before RF transmission link 104.

In step 402, after transmission over RF transmission link 104 and reception by receiving test equipment 106, in one embodiment the frames 102-1 to 102-4 are timestamped with reception times by receiving test equipment 106, for example, 102-R1 corresponding to 102-1, 102-R2 corresponding to 102-2, 102-R3 corresponding to 102-3 and 102-R4 corresponding to 102-4.

In one embodiment, in step 403 the train transmission is then validated by
determining that all of the frames belong to the train.
determining whether all of the frames in the train have been received in order by, for example, checking all the received sequence numbers.
determining that none of the frames within the sequence are missing by, for example, checking all the received sequence numbers.
ensuring that the frames in the train were transmitted in burst mode with the minimum inter-frame gap and ensuring that no other frames were inserted between successive frames in the sequence.
In one embodiment, in order to determine whether no other frames were inserted between successive frames in the sequence, the sum of
the duration of a frame given the length of the frame including the preamble and the bit rate before RF transmission link 104, and
the predetermined minimum gap
is compared with the difference between the transmission time of successive frames. In one embodiment, the transmission time of a frame is obtained from the sending timestamp. If the sum is nearly equal to the difference between the transmission times, then it is likely that no frames were inserted between successive frames in the sequence. In one embodiment, if the sum is within a threshold of the difference between the transmission times, then it is likely that no frames were inserted between successive frames in the sequence.

In another embodiment, in order to determine whether no other frames were inserted between successive frames in the sequence, a determination is made as to whether the receiving time differences between pairs of successive frames in the sequence are equal. If the time difference between a pair of successive frames is greater than the time difference between the other pairs of successive frames, then it is likely that a frame was inserted between one of the pairs of successive frames. For example, if the difference between 102-R3 and 102-R2 is greater than the difference between 102-R2 and 102-R1, or 102-R4 and 102-R3, then it is likely that a frame was inserted between 102-R3 and 102-R2.

Finally, in step 404, the available bandwidth is estimated by dividing the number of bits transmitted by the difference between the receiving time of the leading frame in the train and the receiving time of the last frame of the train. As shown in FIG. 3 this is equal to the number of bits in the first 3 frames 102-1 to 102-3 divided by the time difference between 102-R4 and 102-R1.

In one embodiment, the validating and estimating operations are performed by an application. In one embodiment, the application is implemented within a receiving sensor which is part of the receiving test equipment. In another embodiment, the receiving sensor is not part of the receiving test equipment. In another embodiment, the application is within the receiving test equipment 106. In yet another embodiment, the application is implemented on another node connected to receiving test equipment 106 via a network, and the data necessary to perform the validating and estimating is transmitted to the node.

In one embodiment, the application is located at the sending node. In one embodiment, the frames are DMM frames, and the receiving test equipment is a delay measurement message (DMM) reflector. As is well known to those in the art, the sending timestamp of the DMM frame, denoted as $T_1$, and the receiving timestamp of the DMM frame at the DMM reflector, denoted as $T_2$, are recorded in the DMM frames. Then, the application performs validating and estimating using $T_1$ and $T_2$ when the DMM frames are received at the sending node.

While the example described above uses an example of a train with four frames, it would be known to one of skill in the art that the train may use different numbers of frames other than four frames. The accuracy is likely to increase with an increased number of frames within the train.

In a further embodiment, steps 401 to 404 are repeated using trains wherein each train has frames of different lengths, and the throughput is measured as a function of the frame length. This is useful in networks where the RF transmission link 104 uses compression techniques which make the available bandwidth dependent on the frame length.

In another embodiment, the train comprises a sequence of frames with different lengths, and the steps 401 to 403 as described above are performed. A modified version of step 404 is performed: The available bandwidth for each frame length is estimated by dividing the number of bits transmitted by the difference between the receiving time of a frame, and the receiving time of the next frame. This enables measurement of throughput as a function of the frame length.

In a further embodiment, each train comprises a plurality of groups, wherein each group comprises a plurality of frames, and each frame within the same group is the same length. However the length varies from group to group. For example, consider a train with four groups. Group 1 has four frames of length $L_1$, group 2 has four frames of length $L_2$, and so on. Then step 404 is performed for each group, that is, the available bandwidth is estimated by dividing the number of bits transmitted by the difference between the receiving time of the leading frame in the group and the receiving time of the final frame of the group. This enables measurement of throughput as a function of the frame length.

In one embodiment, there may be more than one radio link between the end points. For example, RF transmission link 104 may be comprised of one or more sub-links. Then the measured bandwidth will be the lowest of the sub-links.

In another embodiment, other layer 2 equipment such as Ethernet switches may be inserted between the transmitting test equipment and receiving test equipment.

While the DMM format has been described above, any suitable packet format which allows for validation of the back-to-back generation of the train can also be used.

Furthermore, while the above has been described in relation to Ethernet, it would be readily apparent to those of skill in the art that this system and method could be applied to other types of networks as well and any types of packets other than frames.

While algorithms to perform the functions described above have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of measuring available bandwidth of a radio frequency (RF) Ethernet transmission link, which uses physical layer compression techniques, the method comprising:
    transmitting a plurality of trains, each train comprising a plurality of groups, each group comprising a plurality of frames with a same length over the link in burst mode, the plurality of frames spaced apart from one another via a predetermined minimum time gap greater than zero, and length of frames corresponding to each group is different to lengths of the frames corresponding to other groups;
    receiving the plurality of trains;
    timestamping each of the plurality of frames with a receiving time;
    estimating an available bandwidth, the estimating comprising:
        for each respective group of the plurality of trains, dividing a number of bits transmitted by a difference between a first receiving time of a leading frame of each respective group and a second receiving time of a final frame of each respective group; and
        measuring a throughput as a function of frame length based on the estimating of the available bandwidth for each of the plurality of trains,
    wherein no frame is transmitted during the predetermined minimum time gap during the estimating available bandwidth.

2. The method of claim 1, wherein the frames are Ethernet frames, and the Ethernet frames of each group are spaced from one another by the predetermined minimum time gap.

3. The method of claim 1, wherein each frame is timestamped with a corresponding frame transmission time.

4. The method of claim 2, further comprising:
    validating each group of the plurality of trains, the validating comprising the following executed in any order:
        a first determination for determining that none of the plurality of frames within each of the plurality of groups of the plurality of trains are missing;
        a second determination for determining whether all of the plurality of frames in each of the plurality of groups of the plurality of trains are transmitted in burst mode, and a third determination for determining whether all of the plurality of frames in each of the plurality of groups of the plurality of trains have been received in order.

5. The method of claim 4, wherein the second determination comprises calculating a sum based on a duration of a test frame and the predetermined minimum time gap.

6. The method of claim 5, wherein each frame is timestamped with a corresponding frame transmission time, the method further comprising:
comparing a sum to a difference between successive frame transmission times.

7. The method of claim 6, wherein the comparing comprises determining when if the sum is within a threshold of the difference between the successive frame transmission times.

8. The method of claim 4, wherein the second determination comprises determining whether receiving time differences between pairs of successive frames in each group of the plurality of trains are equal.

9. A system for measurement of available bandwidth of a radio frequency (RF) transmission link, which uses physical layer compression techniques, the system comprising:
transmission test equipment for transmitting a plurality of trains, each train comprising a plurality of groups, each group comprising a plurality of frames with a same length over the link in a burst mode, the plurality of frames spaced apart from one another via a predetermined minimum time gap greater than zero, and lengths of each frame of the plurality of frames corresponding to each group is different to lengths of the frames corresponding to other groups;
receiving test equipment configured for:
  receiving the plurality of trains;
  timestamping each of the plurality of frames with a receiving time; and
  estimation of an available bandwidth, the estimation comprising:
    for each respective group of the plurality of trains, dividing a number of bits transmitted in each respective group by a difference between a first receiving time of a leading frame of each respective group and a second receiving time of a final frame of each respective group,
    wherein no frame is transmitted during the predetermined minimum time gap during the estimating available bandwidth.

10. The system of claim 9, wherein the frames are Ethernet frames and the Ethernet frames of each group are spaced from one another by the predetermined minimum time gap.

11. The system of claim 9, wherein the transmission test equipment is configured to timestamp each frame with a corresponding frame transmission time.

12. The system of claim 10, wherein the receiving test equipment is configured for:
validation of each group of the plurality of trains, the validation comprising the following executed in any order:
  a first determination for determining that none of the plurality of frames within each of the plurality of groups of the plurality of trains are missing;
  a second determination for determining whether all of the plurality of frames in each of the plurality of groups of the plurality of trains are transmitted in the burst mode, and
  a third determination for determining whether all of the plurality of frames in each of the plurality of groups of the plurality of trains have been received in order.

13. The system of claim 12, wherein the second determination comprises calculating a sum based on a duration of a test frame and the predetermined minimum time gap.

14. The system of claim 13, wherein each frame is timestamped with a corresponding frame transmission time, and wherein the second determination comprises:
comparing a sum to a difference between successive frame transmission times.

15. The system of claim 14, wherein the comparing comprises determining when the sum is within a threshold of the difference between the successive frame transmission times.

16. The system of claim 12, wherein the second determination comprises determining whether receiving time differences between pairs of successive frames in each group of the plurality of trains are equal.

* * * * *

UNITED STATES PATENT AND TRADEMARK OFFICE
CERTIFICATE OF CORRECTION

PATENT NO. : 10,979,332 B2
APPLICATION NO. : 14/530702
DATED : April 13, 2021
INVENTOR(S) : St-Laurent et al.

It is certified that error appears in the above-identified patent and that said Letters Patent is hereby corrected as shown below:

In the Claims

Claim 6, Column 7, Line 10:
Delete the phrase "comparing a sum" and insert -- comparing the sum --

Claim 7, Column 7, Line 13:
Delete the phrase "determining when if the sum" and insert -- determining when the sum --

Claim 14, Column 8, Line 33:
Delete the phrase "comparing a sum to" and insert -- comparing the sum to --

Signed and Sealed this
Seventeenth Day of September, 2024

Katherine Kelly Vidal
*Director of the United States Patent and Trademark Office*